(12) United States Patent
Tschudin et al.

(10) Patent No.: US 12,055,422 B2
(45) Date of Patent: Aug. 6, 2024

(54) MAGNETICALLY INDUCTIVE FLOW MEASURING DEVICE AND METHOD FOR DETERMINING A FILL LEVEL

(71) Applicant: Endress+Hauser Flowtec AG, Reinach (CH)

(72) Inventors: Beat Tschudin, Reinach (CH); Thomas Bier, Riehen (CH)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 17/997,971

(22) PCT Filed: Apr. 23, 2021

(86) PCT No.: PCT/EP2021/060713
§ 371 (c)(1),
(2) Date: Nov. 4, 2022

(87) PCT Pub. No.: WO2021/224035
PCT Pub. Date: Nov. 11, 2021

(65) Prior Publication Data
US 2023/0168114 A1 Jun. 1, 2023

(30) Foreign Application Priority Data
May 5, 2020 (DE) ...................... 10 2020 112 151.2

(51) Int. Cl.
*G01F 1/58* (2006.01)
*G01F 23/26* (2022.01)

(52) U.S. Cl.
CPC .............. *G01F 1/588* (2013.01); *G01F 23/26* (2013.01)

(58) Field of Classification Search
CPC ................... G01F 1/56–588; G01F 23/26–268
See application file for complete search history.

(56) References Cited

U.S. PATENT DOCUMENTS 9,243,941 B2 * 1/2016 Reichart ................... G01F 1/60
9,671,260 B2 * 6/2017 Isik-Uppenkamp .... G01F 1/584

FOREIGN PATENT DOCUMENTS

| DE | 19615140 A1 | 10/1997 |
| DE | 19752368 C1 | 1/2000 |
| DE | 10201200891 A1 | 10/2013 |
| DE | 102012006891 A1 | 10/2013 |
| DE | 102018126679 A1 | 4/2020 |
| EP | 0892251 A1 | 1/1999 |

* cited by examiner

*Primary Examiner* — Justin N Olamit
(74) *Attorney, Agent, or Firm* — Kelly J. Smith; Endress+Hauser (USA) Holding, Inc.

(57) ABSTRACT

A magnetically inductive flow measuring probe includes a housing; at least one measuring electrode for forming a galvanic contact with the medium and for tapping an induced voltage in the medium; a device for generating a magnetic field, wherein the device is arranged in the housing, wherein the device comprises a field guide assembly and a coil arrangement, wherein the field guide assembly functions as a sensor electrode for capacitively determining and/or monitoring a fill level of the medium in the tube line or the measuring tube. The present disclosure also relates to a method for determining a fill level of a medium in a measuring tube or in a tube line using the magnetically inductive flow measuring device.

11 Claims, 2 Drawing Sheets

MAGNETICALLY INDUCTIVE FLOW MEASURING DEVICE AND METHOD FOR DETERMINING A FILL LEVEL

CROSS-REFERENCE TO RELATED APPLICATIONS

The present application is related to and claims the priority benefit of DPMA Patent Application No. 10 2020 112 151.2, filed on May 5, 2020 and International Patent Application No. PCT/EP2021/060713, filed on Apr. 23, 2021, the entire contents of which are incorporated herein by reference.

TECHNICAL FIELD

The invention relates to a magnetically inductive flow measuring device for determining a flow velocity-dependent measured variable of a flowable medium in a measuring tube or in a tube line and to a method for determining a fill level of a medium in a measuring tube or in a tube line.

BACKGROUND

A magnetically inductive flow measuring device comprises meters that detect a flow velocity-dependent measured variable of a medium relative to the meter based on Faraday's law of electromagnetic induction. Magnetically inductive flow measuring devices comprise, for example, magnetically inductive flow meters through which the medium to be monitored flows and/or magnetically inductive flow measuring probes that are used in tube lines and against which medium flows.

Magnetically inductive flow meters comprise a measuring tube for conducting a flowable medium and are used to determine the flow rate and the volumetric flow of the medium into a process line. A magnetically inductive flow meter has a device for generating a magnetic field, which generates a magnetic field passing through the measuring tube perpendicularly to the flow direction of the flowing medium. For this purpose, individual coils are usually used, which together form a coil arrangement. In order to realize a predominantly homogeneous magnetic field, pole shoes are formed in addition to the coil cores and are attached such that the magnetic field lines run over the entire tube cross-section substantially perpendicularly to the transverse axis or in parallel to the vertical axis of the measuring tube. A measuring electrode arrangement attached to the lateral surface of the measuring tube taps an electrical measurement voltage or potential difference that is induced perpendicularly to the flow direction and to the magnetic field and arises when a conductive medium flows in the flow direction when the magnetic field is applied. Since, according to Faraday's law of induction, the tapped measurement voltage depends on the velocity of the flowing medium, the flow rate u and, with the aid of a known pipe cross-section, the volumetric flow V can be determined from the induced measurement voltage U.

In contrast to a magnetically inductive flow meter, which comprises a measuring tube for conducting the medium with an attached device for generating a magnetic field penetrating the measuring tube and with measuring electrodes, magnetically inductive flow measuring probes are inserted with their usually circular cylindrical housings into a lateral opening of a tube line and fixed in a fluid-tight manner. A special measuring tube is no longer necessary. The measuring electrode arrangement and coil arrangement, mentioned in the introduction, on the lateral surface of the measuring tube are omitted and are replaced by a device for generating a magnetic field, which device is arranged in the interior of the housing and in direct proximity to the measuring electrodes and is designed such that an axis of symmetry of the magnetic field lines of the generated magnetic field perpendicularly intersects the front face or the face between the measuring electrodes. In the prior art, there is already a plurality of different magnetically inductive flow measuring probes.

EP 0 892 251 A1, for example, teaches a magnetically inductive flow measuring probe with a front plate, which is designed as a spherical cap, and a coil that is pushed onto a cylindrical coil core, which functions as a coil carrier. No magnetically inductive flow measuring probes that are designed to detect full and/or partial filling of the tube line have been known so far. Rather, such a functionality is known in magnetically inductive flow meters.

WO 2014/053324 A2, for example, teaches a magnetically inductive flow meter with a fill-level monitoring system that, in addition to the distinction between partial and full filling, allows the determination of the medium temperature with a temperature sensor integrated into a fill-level electrode and at the same time is characterized by a compact structure. For monitoring the fill level, a conductivity of the medium between the fill-level monitoring electrode and a reference electrode or a measuring electrode is determined. For this purpose, it is necessary for the fill-level monitoring electrode to form a galvanic contact with the medium to be conducted. This is disadvantageous in that, as a result, an additional opening for the fill-level monitoring electrode must be provided in the measuring tube, and the fill-level monitoring electrode is thus exposed to a possibly abrasive and corrosive medium without protection.

A device for determining a fill level in a measuring tube is known from DE 196 15 140 A1, which device is configured to determine a capacitance dependent on the dielectric constant of the medium and the fill height using two capacitor plates attached to the outer surfaces of the measuring tube and to determine a fill height from the determined capacitance.

DE 10 2012 006 891 A1 teaches a magnetically inductive flow meter which determines a degree of filling in addition to the flow velocity-dependent measured variable. For this purpose, it has an additional magnetic field generating device which generates a magnetic field whose magnetic field lines run in parallel to the longitudinal axis of the measuring tube. The measurement voltage caused by the additional magnetic field at the strip-shaped measuring electrodes is a measure of the fill level of the medium.

SUMMARY

The object of the invention is to provide an alternative magnetically inductive flow measuring device that is suitable for providing information about a fill level of the medium.

In addition, the object of the invention is to provide an alternative method for a magnetically inductive flow measuring device, with which method a fill level of the medium can be determined.

The object is achieved by the magnetically inductive flow measuring device and the method for determining a fill level according to the present disclosure.

The magnetically inductive flow measuring device according to the invention for determining a flow velocity-dependent measured variable of a flowable medium in a measuring tube or in a tube line comprises:
- a housing;
- a device for tapping an induced voltage in the medium, in particular at least one measuring electrode for forming a galvanic contact with the medium;
- a device for generating a magnetic field,
  - wherein the device is arranged in the housing,
  - wherein the device comprises a field guiding assembly and a coil arrangement,
  - wherein the field guiding assembly serves as a sensor electrode for capacitively determining and/or monitoring at least one process variable, in particular a fill level of the medium in the tube line or the measuring tube.

The field guiding assembly serves to amplify and guide the magnetic field generated by the coil arrangement. It comprises at least one field guiding body, such as a coil core, which is arranged in a coil of the coil arrangement. In addition, pole shoes are frequently used, which serve to ensure that when the magnetic field lines of the magnetic field exit the coil core, they run in parallel over the largest possible cross-sectional area of the measuring tube or the tube line. In addition, magnetically inductive flow measuring devices are known in which field return bodies are used in order to guide the generated magnetic field back to the coil core in a controlled manner. The field guiding body may be monolithic or partially monolithic. For example, it is known to form the coil core and the pole shoe in one piece, wherein the part extending through an opening of the coil is referred to as a coil core and the part extending between the coil and the housing wall or measuring tube wall in the direction of the medium is referred to as a pole shoe. The individual components of the field guiding body generally comprise soft magnetic materials. According to the invention, an electrically conductive material is to be used for the field guiding body.

Capacitive fill-level meters are known, which determine the fill level of a medium in a container starting from a determined capacitance or capacitance change. For this purpose, a capacitive fill-level meter has a sensor electrode which is arranged in a housing with an electrically insulating wall and, together with a conductive counter electrode, generally the metallic wall of the container, forms an electric capacitor. A distinction is to be made between applications in which an electrically conductive medium is used and applications in which an electrically non-conductive medium is used. Conductive media which are in electrical contact with the counter electrode assume the electrical potential of the counter electrode so that the electrical field forms substantially in the electrically insulating wall of the housing. If a non-conductive medium is located between the sensor electrode and the counter electrode, the electrical field is formed in the medium, as a result of which the dielectric constant of the medium has a significant influence on the determined capacitance.

Meters based on the capacitive measuring principle are known per se from the prior art and are produced by the applicant in many different designs and sold, for example, under the names Liquicap, Solicap, or Liquipoint. Capacitive meters generally have a substantially cylindrical housing with at least one sensor electrode which can be introduced at least partially into a container or a tube line. On the one hand, rod-shaped meters which extend vertically into the container are widely used, in particular for continuous fill-level measurement. However, for detecting a limit level, meters that can be introduced into the side wall of a respective container have also become known.

The present field guiding assembly has a field guiding body which is electrically conductive. This allows the field guiding assembly to be used for a non-intended purpose and to be configured as a sensor electrode which determines a measuring capacitance on the basis of which statements about the fill level of the medium in the tube line or in the measuring tube can be made. In this case, the medium takes on the role of either the counter electrode or the dielectric.

The present invention is suitable for continuously monitoring and/or determining the fill level, which comprises determining the present fill height, or for determining whether a binary state or which binary state, i.e., full or partial filling, is present.

For the determination of a volumetric flow, the determined flow velocity is multiplied by the cross-sectional area of the measuring tube or of the tube line. However, this applies only if the measuring tube is full. It is therefore advantageous if the magnetically inductive flow measuring device is additionally designed to make a statement as to whether or not a partial filling or full filling is present.

Field devices in the form of multi-sensors are already known. Thus, meters exist which can operate in both a capacitive and a conductive operating mode. Examples thereof are disclosed in documents DE 10 2011 004 807 A1, DE 10 2013 102 055 A1, or DE 10 2014 107 927 A1. In addition to the fill level as process variable, various media-specific properties, such as the electrical conductivity of the medium, or also dielectric properties of the medium, such as its dielectric constant, can be determined by means of such a multi-sensor, as described in DE 10 2013 104 781 A1. Such meters differ from the subject matter of the present invention in particular in that the measuring electrodes are used to determine a conductivity of the medium and not, as according to the invention, to determine an induced measurement voltage. In addition, such meters do not have a device for generating a magnetic field, which is indispensable for determining a flow velocity-dependent measured variable based on Faraday's law of electromagnetic induction.

The flow velocity-dependent measured variable comprises a flow rate, a volumetric flow, and/or a mass flow.

Advantageous embodiment of the invention are the subject matter of the dependent claims.

One embodiment provides that an operating circuit arranged in particular in the housing is in particular electrically connected to the field guiding assembly, wherein the operating circuit is configured to supply an in particular temporally alternating excitation signal to the field guiding assembly, to receive a response signal from the field guiding assembly, and to make a statement about the fill level of the medium in the tube line or the measuring tube at least from the response signal.

During the measurement operation, the sensor electrode is supplied with an excitation signal, generally in the form of an alternating current signal or an alternating voltage signal. This is provided by the operating circuit. The respective process variable, i.e., the present fill level or whether full filling is present, can subsequently be determined from the response signal received from the sensor electrode or a further sensor electrode designed and configured for this purpose. According to the capacitive measuring principle, the dependence of the response signal on the capacitance of the capacitor formed by the sensor electrode and the wall of the container, or of the capacitor formed by the sensor electrode and a second electrode, is utilized. Depending on the conductivity of the medium, either the medium itself or an insulation of the sensor electrode forms the dielectric of this capacitor.

In order to evaluate the response signal received from the sensor electrode with respect to the fill level, either an apparent current measurement or an admittance measurement can then be performed, for example. In the case of an apparent current measurement, the magnitude of the apparent current determined at the sensor electrode is measured. However, since the apparent current itself has an active and a reactive component, the phase angle between the apparent current and the voltage applied to the sensor unit is measured in addition to the apparent current in the case of an admittance measurement. A further possibility for determining a fill level is to determine a frequency shift between the reference signal and response signal, wherein the reference signal is determined in an adjustment method, for example in a factory adjustment method.

Moreover, the additional determination of the phase angle makes it possible to make statements about a possible accretion formation, as has become known, for example, from DE102004008125A1.

The operating circuit is responsible for feeding, acquiring and evaluating signals and is designed accordingly. It may be configured to carry out particular operations comprising a control structure in order to provide an excitation signal and determine a response signal. In particular embodiments, the operating circuit forms part of a processing subsystem comprising one or more computing devices with memory, processing, and/or communication hardware. The operating circuit can be a single unit or a multi-part unit, which parts communicate with one another. The functions of the operating circuit can be carried out by hardware and/or software. The operating circuit may contain one or more arithmetic logic units (ALUs), central processing units (CPUs), memories, limiters, conditioners, filters, oscillators, format converters, or the like, which are not shown for the sake of clarity. In one form, the operating circuit can be programmed to execute algorithms and process data according to the operating logic defined by programming instructions, such as software or firmware. Alternatively or additionally, the operating logic for the operating circuit may be defined at least partially by hardwired logic or other hardware, for example by an application-specific integrated circuit (ASIC) of any suitable type. It must be taken into account that the operating circuit can be intended exclusively for the generation of the excitation signal and the determination of the response signal or can furthermore be used in the regulation, control, and activation of one or more other subsystems or aspects of the magnetically inductive flow measuring device.

One embodiment provides that the magnetically inductive flow measuring device comprises a magnetically inductive flow measuring probe for insertion into a tube line through which a medium can flow,
  wherein the magnetically inductive flow measuring probe has a housing that is in particular cylindrical and is configured to be supplied with the medium,
  wherein the housing has an end portion that comprises an at least partially electrically insulating wall,
  wherein the at least one measuring electrode is arranged in the wall of the housing,
  wherein the device for generating the magnetic field is configured to generate a magnetic field penetrating the end portion.

The housing of the magnetically inductive flow measuring probe has a housing, which is configured and suitable for being supplied with the medium to be conducted. This means that the housing contacts the medium during operation, unlike magnetically inductive flow meters.

Usually, the generally cylindrical housing of the magnetically inductive flow measuring probe has a cavity in which the device for generating the magnetic field, the electrical conductors and, for application-related reasons, also the operating, measurement and/or evaluation circuit are arranged. The housing can also be formed or fully cast as a cast body, wherein the electrical conductors, the at least one measuring electrode and the device for generating the magnetic field are co-cast. The housing is usually at least partially cylindrical or hollow cylindrical, but it may also be partially cuboid for application-related reasons. The medium-contacting casing of the housing is usually designed to be conductive, for example made of metal or metalized, and serves as a reference electrode. However, magnetically inductive flow measuring probes, with which the reference electrode is designed as a ring electrode or where the medium to be conducted is connected to a reference potential via a connection body, are also known.

According to an advantageous embodiment, the housing is provided with a front body at the medium-contacting end face, which front body closes the cavity of the housing. The front body is preferably at least partially disk-shaped. The front body seals the housing interior against the flowing medium in the tube line. The at least one measuring electrode is arranged in the front body.

The magnetically inductive flow measuring probe is inserted into the opening of a tube such that the front portion of the housing is in direct contact with the medium to be conducted.

For detecting a flow velocity-dependent measured variable induced in the medium, a measuring electrode arrangement, in particular at least one measuring electrode in combination with a reference electrode, is required, which is electrically connected to a reference potential, in particular a ground potential. The reference electrode can be realized, for example, as a pin electrode, as a ring electrode or also by a partially metallic housing, which is connected to a reference potential, for example a grounding. Commercially available magnetically inductive flow measuring probes, however, have two measuring electrodes that are arranged on a measuring electrode axis and are arranged on the medium-contacting end face of the front body, wherein the magnetically inductive flow measuring probe is to be arranged in the opening of a tube such that the measuring electrode axis preferably runs perpendicularly to the flow direction of the medium.

A measuring electrode arrangement consisting of at least two measuring electrodes can already be pre-assembled for the production of the magnetically inductive flow measuring probe, i.e., the at least two measuring electrodes are connected to one another via a connection body. Such a measuring electrode arrangement is then inserted into the tool of an injection-molding system and is co-cast with the front body. Alternatively, continuous holes can be provided in the front body, into which holes the measuring electrodes, which are usually designed as a tip electrode, are pressed. Magnetically inductive flow measuring probes with more than three measuring electrodes are known.

One embodiment provides that the field guide assembly comprises a coil core, a pole shoe and/or a field return body.

The coil arrangement can comprise exactly one coil or several coils. A coil usually comprises a coil arrangement carrier with an opening and at least one coil wire wound around the coil arrangement carrier. The opening in the coil arrangement carrier is preferably designed such that a field guide body, for example in the form of a coil core and/or a field return body, can be inserted in a form-fitting manner. The magnetically inductive flow measuring probe according to the invention preferably comprises exactly one coil.

The pole shoe can be formed by a separate component or can be part of the coil core. In the second case, the portion of the coil core that is arranged between the coil or coil core and the coil and front portion of the magnetically inductive flow measuring probe is to be interpreted as a pole shoe.

Conventional coil cores are designed to be fully cylindrical. According to the invention, the coil core can be fully cylindrical or can be formed of at least one sheet metal part.

The field return body serves to return, in a controlled manner, the magnetic field exiting from the coil core and/or pole shoe. For this purpose, it is connected to one end of the coil core. Field return bodies that are hollow cylindrical are known. According to the invention, the field return body can be designed to be hollow cylindrical or as a sheet metal part, in particular as part of the at least one sheet metal part forming the coil core.

If the operating circuit is electrically connected to the field guide body, a capacitance between the field guide body and the conductive medium is formed during operation. This capacitance depends on the fill level of the medium in the tube line. According to the invention, a fill level is determined on the basis of the determined measuring capacitance, in particular whether partial or full filling is present.

If the operating circuit is electrically connected to the coil core, a capacitance between the coil core and the conductive medium is formed during operation. This capacitance depends on the fill level of the medium in the tube line. According to the invention, a fill level is determined on the basis of the determined measuring capacitance, in particular whether partial or full filling is present.

If the operating circuit is electrically connected to the pole shoe, a capacitance between the pole shoe and the conductive medium is formed during operation. This capacitance depends on the fill level of the medium in the tube line. According to the invention, a fill level is determined on the basis of the determined measuring capacitance, in particular whether partial or full filling is present.

If the individual components of the field guide assembly are in electrical contact, an electrical capacitance is formed between the entire field guide assembly and the conductive medium, which forms a measure of a fill level of the medium in the tube line.

One embodiment provides that the magnetically inductive flow measuring probe comprises an annular electrode arranged around the wall of the housing,
wherein the operating circuit is configured to impress the excitation signal on the field guide body with respect to the annular electrode.

The operating circuit is advantageously configured to determine the response signal with respect to the reference electrode at the field guide body.

The electrode can be formed by a hollow cylindrical metallic housing or can be provided as a separate electrode on the outer surface of the housing.

One embodiment provides that the magnetically inductive flow measuring probe is suitable for being fastened via a metallic connection body in a tube line, in particular a metallic tube line,
wherein the magnetically inductive flow measuring probe is designed in such a way that, when the magnetically inductive flow measuring probe is connected to the connection body, an electrical contact forms between the operating circuit and the connection body,
wherein the operating circuit is configured to impress the excitation signal on the field guide body with respect to the connection body.

One embodiment provides that the field system has a field return body that is connected to an end portion of the coil core.

One embodiment provides that at least a segment of the field guide body contacts the electrically insulating wall of the housing.

One embodiment provides that the wall of the housing has an outer surface that can be impinged by the medium,
wherein a cutout of the field guide assembly is spaced apart from the outer surface exclusively by the wall of the housing.

The field guide body serving as the sensor electrode is ideally separated from the medium exclusively by the wall of the housing. In this case, the electrical capacitance that forms between the field guide body and the medium depends substantially on the dielectric constant of the material of the wall, the wall thickness and the contact surface, wetted by the medium, between the medium and the housing. If the fill level and thus the size of the contact surface changes, a fill level or the presence of full filling or partial filling can be determined on the basis of the determinable measuring capacitance.

One embodiment provides that the operating circuit is connected to the coil arrangement and is configured to generate a clocked magnetic field with excitation phases and with rest phases that are respectively located between two excitation phases and in which substantially no coil current flows,
wherein in one of the rest phases, the excitation signal is generated and the corresponding response signal is received.

In order to avoid a shift of the zero point, a clocked magnetic field with alternating magnetic field direction is in most cases generated via the coil arrangement. In the phases of the excitation phase, in which the coil current at the coil arrangement is substantially constant, the induced measurement voltage is determined and used for the determination of the flow velocity-dependent induced measurement voltage. According to the advantageous embodiment, rest phases, in which the coil current and thus also the generated magnetic field are zero, are provided between individual excitation phases. In these rest phases, the excitation signal is impressed on the sensor electrode and a response signal is determined. This ensures that the induced measurement voltage does not have any influence on the response signal, and the generated excitation signal does not have any influence on the measured induced voltage.

One embodiment provides that the operating circuit is configured to determine a measured value of an electrical capacitance of the field guide assembly to the medium at least on the basis of the response signal and to determine information regarding the fill level on the basis of a deviation of the determined measured values from a reference value.

In the simplest case, the determination of the information regarding the fill level comprises the presence of full filling or partial filling. In an adjustment method or calibration method, a reference capacitance is assigned to the magnetically inductive flow measuring probe and represents full filling or partial filling of the medium in the tube line. If the determined measuring capacitance deviates from the reference capacitance, this can be signaled to the operator or transmitted to an evaluation unit, which takes into account the change in the fill level in the calculation of the volumetric flow.

A method according to the invention for determining a fill level in a tube line using a magnetically inductive flow measuring device, in particular with the magnetically inductive flow measuring device according to the invention, comprises the method steps of:

supplying an electrical, in particular temporally alternating, excitation signal to a field guiding body, receiving an electrical reception signal from the field guide body, determining a measuring capacitance of the field guide body at least on the basis of the reception signal, and determining a fill level in a tube line or a measuring tube on the basis of the measuring capacitance.

BRIEF DESCRIPTION OF THE DRAWINGS

The invention is explained in greater detail with reference to the following figures. The following are shown.

DETAILED DESCRIPTION

Figure 1:
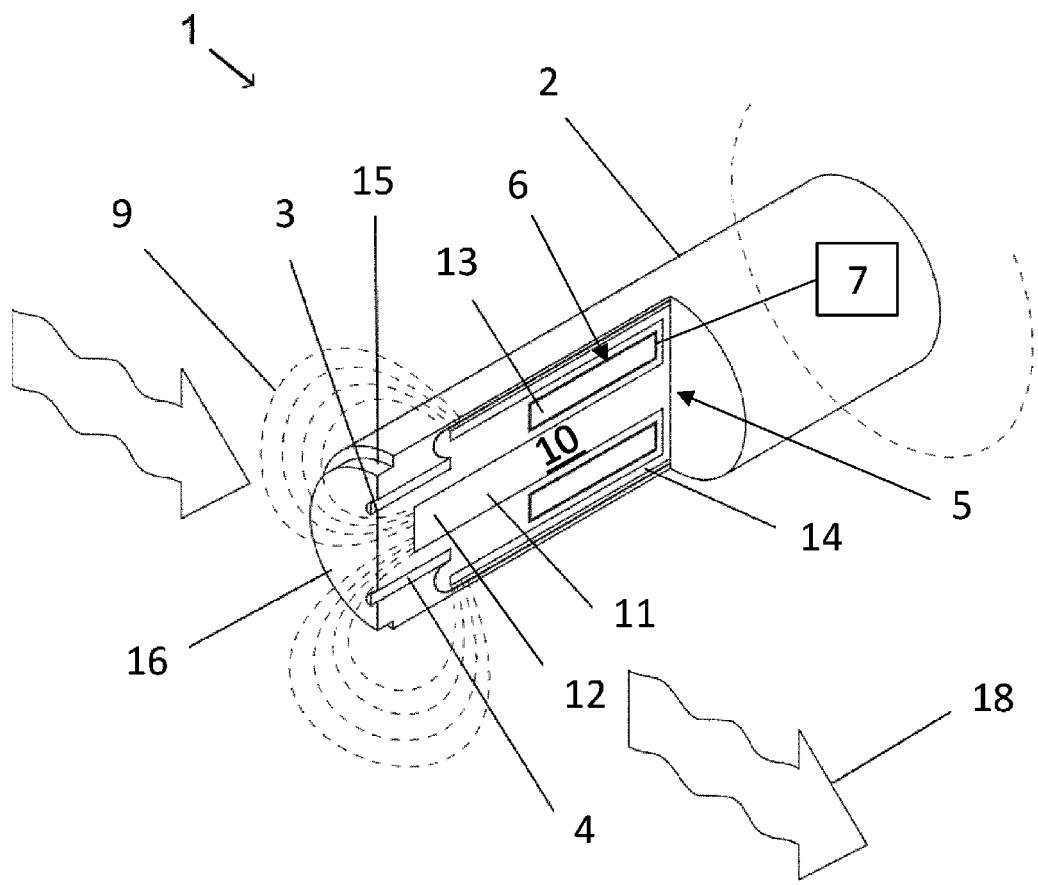
FIG. 1 shows a perspective partially sectional view of a magnetically inductive flow measuring probe according to the prior art.

The measuring principle on which the invention is based is first explained on the basis of the perspective and partially sectional illustration of FIG. 1. A flow measuring probe 1 comprises a generally circular cylindrical housing 2 having a predetermined outer diameter. Said housing is adapted to the diameter of a bore, which is located in a wall of a tube line 8 (not shown in FIG. 1 but shown in FIG. 2) into which the flow measuring probe 1 is inserted in a fluid-tight manner. A medium to be measured flows in the tube line 8 and the flow measuring probe 1 is immersed into said medium practically perpendicularly to the flow direction of the medium, which is indicated by the wavy arrows 18. A front end 16 of the housing 2 that projects into the medium is sealed in a fluid-tight manner with a front body 15 made of insulating material. By means of a coil arrangement 6 arranged in the housing 2, a magnetic field 9 that extends through the end portion into the medium can be generated. A coil core 11, which at least partially consists of a soft magnetic material and is arranged in the housing 2, terminates at or near the end portion 16. A field return body 14 that surrounds the coil arrangement 6 and the coil core 11 is configured to return, into the housing 2, the magnetic field 9 extending through from the end portion. The coil core 11, the pole shoe 12 and the field return body 14 are each field guide bodies 10, which together form a field guide assembly 5. A first and a second galvanic measuring electrode 3, 4 are arranged in the front body 15 and contact the medium. An electrical voltage induced due to Faraday's law of induction can be tapped at the measuring electrodes 3, 4 by means of a measurement and/or evaluation unit. This is at a maximum if the flow measuring probe is installed in the tube line such that a plane spanned by a straight line intersecting the two measuring electrodes 3, 4 and by a longitudinal axis of the flow measuring probe runs perpendicularly to the flow direction 18 or to the longitudinal axis of the tube line. An operating circuit 7 is electrically connected to the coil arrangement 6, in particular to the coil 13, and is configured to impress a clocked excitation signal to the coil in order to thus generate a clocked magnetic field 9.

Figure 2:
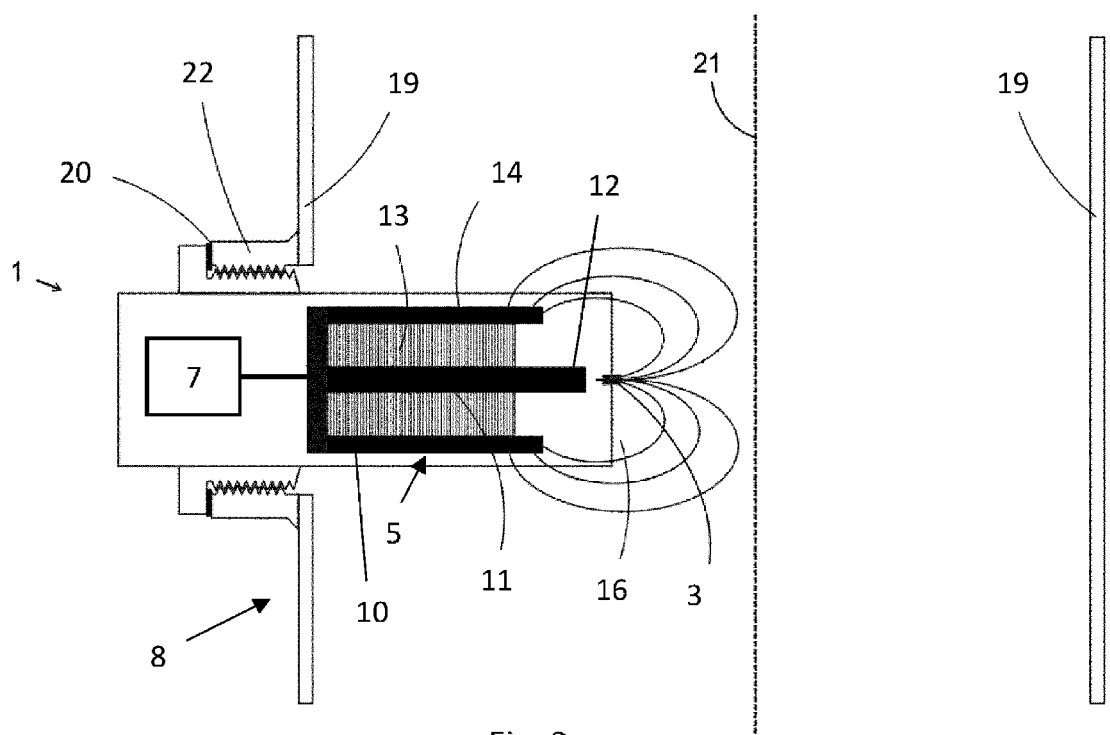
FIG. 2 shows a longitudinal section through an embodiment of the magnetically inductive flow measuring probe according to the present disclosure inserted in a tube line.

FIG. 2 shows a longitudinal section of a magnetically inductive flow measuring probe 1 installed in a tube line 8. The flow measuring probe 1 is fastened in the tube line 8 in a fluid-tight manner by means of a screw-in connection 22, which is inserted into the tube wall 19 of the tube line 8 and is welded thereto, for example. This structure of the measuring point is particularly expedient, since the screw-in connection 22 can initially be inserted into the tube line 8 and welded therein, and only afterwards does the magnetically inductive flow measuring probe 1 have to be inserted with a connection body 20 into the screw-in connection 22, in turn screwed therein, and sealed by means of a seal. As a result of the installation, an unknown installation angle between the tube longitudinal axis and the electrode axis is produced. The two measuring electrodes 3, 4 are arranged on the end portion 16 symmetrically to a center of the end portion 16. The coil core 11 is designed to be fully cylindrical and oriented coaxially to the housing. The field return body 14 is hollow cylindrical and is in contact with one end of the coil core 11. The coil core 11, pole shoe 12 and field return body 14 are formed monolithically. An installation depth D indicates how deep the flow measuring probe 1 is inserted into the medium or projects into the tube line.

According to the invention, the operating circuit 7 is connected to the field guide assembly 5, in particular to a field guide body 10 of the field guide assembly 5. In the illustrated embodiment, the field guide assembly 5 is formed in one piece by a coil core 11, a pole shoe 12 and a field guide body 14. The operating circuit 7 is designed to generate an, in particular temporally alternating, excitation signal and to supply it to the field guide assembly 5 or the field guide body 14. In addition, the operating circuit 7 is configured to tap a response signal at the field guide assembly 5 or the field guide body 14 and to make a statement about the fill level of the medium in the tube line, at least as a function of the response signal. The excitation signal and the response signal each have an amplitude and a frequency. A statement about the fill level can be made on the basis of an amplitude difference. Alternatively, the operating circuit can be configured to determine a phase difference or a variable of the two signals dependent on the phase difference and to make a statement about the fill level therefrom. Alternatively, the operating circuit can be configured to determine the fill level on the basis of the frequency of the response signal. Alternatively, taking into account the excitation signal, the response signal and an equivalent circuit diagram, a measuring capacitance can be determined, on the basis of which conclusions can be drawn about the fill level.

Figure 3:
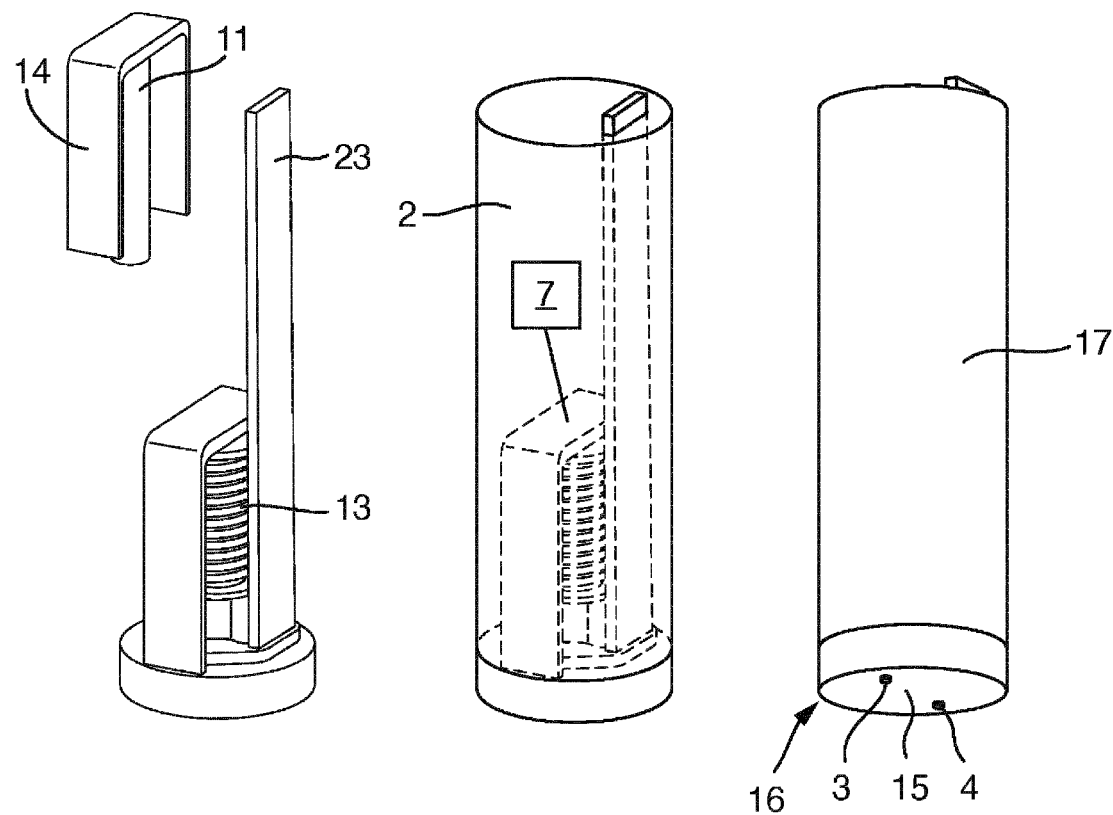
FIG. 3 shows three views of an embodiment of the magnetically inductive flow measuring probe according to the present disclosure.

FIG. 3 shows a side view of an embodiment of the front body 15 with a coil arrangement carrier 24 with mounted coil core 11, field return body 14 and contacting device 23. The front body 15 shown has all essential features of FIG. 1. In addition to the coil arrangement carrier 24 and to the front body 5, a field return body 14, a coil core 11, which extends through the cross-sectional areas of the coil 13, and a contacting device 23 are shown.

Furthermore, FIG. 3 shows a coil core 11 with a field return body 14, which together form the sensor electrode.

The coil core 11 is cylindrical and the field return body 14 has the basic shape of a bent strip. In addition, the field return body 14 has a symmetry number of 2. The field return body 14 and the coil core 11 can or are monolithically formed according to the depicted embodiment. Alternatively, the field guide assembly can consist of at least two assembled individual components. The field guide assembly is arranged on a front body and extends partially through an opening of a coil carrier. Two measuring electrodes are arranged in the front body and are connected via a contacting device 23 to a measurement and/or evaluation circuit (not shown). The contacting device 23 is formed from a circuit board, in particular from a flexible printed circuit board, on which a measurement and/or operating circuit can be arranged.

FIG. 3 also shows two perspective views of the front body 15 mounted on an end portion 15 of a housing 2. The housing 2 has a cylindrical basic shape. The housing 2 can be cast with a casting compound for fixing the field system. The front body 15 of the depicted embodiment has a measuring electrode arrangement with two measuring electrodes 3, 4 located on a diameter of the front body 15. The front body 15 is pressed in a medium-sealing manner into the housing 2 or is arranged, in particular compressed, in a medium-tight manner with a seal. A housing casing of the housing is designed to be electrically conductive and serves as a reference electrode 17. In addition, the operating circuit 7 electrically connected to the field guide assembly is co-cast in the housing. Alternatively, it can also be arranged outside the housing 2.

Figure 4:
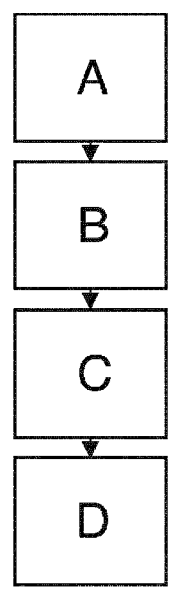
FIG. 4 shows a method sequence according to the present disclosure for determining a fill level of a medium in a measuring tube or in a tube line using a magnetically inductive flow measuring device.

FIG. 4 shows a method sequence according to the invention for determining a fill level of a medium in a measuring tube using a magnetically inductive flow measuring probe. In a first method step A, a temporally alternating excitation signal is applied to a field guiding assembly. The field guiding assembly comprises at least one field guiding body which is formed by at least one coil core and/or at least one pole shoe. The excitation signal is supplied via an operating circuit which is electrically connected to the field guiding assembly or to at least one of the field guiding bodies. In a further method step B, an electrical response signal is received by means of the operating circuit from the field guide assembly or the field guide body. In this case, supplying and receiving take place at a single field guiding body. Alternatively, the excitation signal can be applied to a first field guiding body and the response signal can be received at a second field guiding body. On the basis of the response signal, taking into account the excitation signal, in a further method step C, a measuring capacitance or a variable dependent on the electrical capacitance between sensor electrode and medium is determined, which is dependent on the fill level of the medium in the measuring tube. In a last method step D, a fill level is then determined as a function of the determined measuring capacitance or the variable dependent on the electrical capacitance between sensor electrode and medium. Alternatively, a deviation of the, for example, determined measuring capacitance from a reference value or a reference range can be determined and a warning message can optionally be output or transmitted to an evaluation circuit, which is configured to determine a volumetric flow rate as a function of the induced measurement voltage.

The invention claimed is:

1. A magnetically inductive flow measuring device for determining a flow velocity-dependent measured variable of a flowable medium in a measuring tube or in a tube line, comprising:
a housing;
a device for tapping a measurement voltage induced in the flowable medium, and forming a galvanic contact with the medium using at least one electrode;
a device for generating a magnetic field,
wherein the device is arranged in the housing,
wherein the device comprises a field guiding assembly and a coil arrangement,
wherein the field guiding assembly serves as a sensor electrode for capacitively determining or monitoring a fill level of the medium in the tube line or the measuring tube,
wherein the magnetically inductive flow measuring device includes a magnetically inductive flow measuring probe for insertion into the tube line through which the medium can flow,
wherein the magnetically inductive flow measuring probe has the housing,
wherein the housing is cylindrical and is configured to be supplied with the medium,
wherein the housing has an end portion that comprises an at least partially electrically insulating wall,
wherein the at least one measuring electrode is arranged in a wall of the housing,
wherein the device for generating the magnetic field is configured to generate a magnetic field penetrating the end portion.

2. The magnetically inductive flow measuring device of claim 1, comprising:
an operating circuit arranged in the housing,
wherein the operating circuit is electrically connected to the field guiding assembly,
wherein the operating circuit is configured to supply a temporally alternating excitation signal to the field guiding assembly, to receive a response signal from the field guiding assembly, and to make a statement about the fill level of the medium in the tube line or the measuring tube at least from the response signal.

3. The magnetically inductive flow measuring device of claim 1, wherein the field guide assembly comprises a coil core, a pole shoe or a field return body.

4. The magnetically inductive flow measuring device of claim 1,
wherein the magnetically inductive flow measuring probe comprises an annular electrode arranged around the wall of the housing,
wherein an operating circuit is configured to impress an excitation signal between the annular electrode and a field guide body.

5. The magnetically inductive flow measuring device of claim 1,
wherein the magnetically inductive flow measuring probe is suitable for being fastened via a metallic connection body in the tube line,
wherein the magnetically inductive flow measuring probe is designed in such a way that, when the magnetically inductive flow measuring probe is connected to the connection body, an electrical contact forms between an operating circuit and the connection body,
wherein the operating circuit is configured to impress an excitation signal between the connection body and a field guide body.

6. The magnetically inductive flow measuring device according to claim 1,
wherein the field guide assembly has a field return body, which is connected to an end portion of the coil core.

7. The magnetically inductive flow measuring device of claim 1,
wherein at least a segment of the field guide body contacts the electrically insulating wall of the housing.

8. The magnetically inductive flow measuring device of claim 1,
wherein the wall of the housing has an outer surface that can be impinged by the medium.

9. The magnetically inductive flow measuring device of claim 1,
wherein an operating circuit is connected to the coil arrangement and is configured to generate a clocked magnetic field with excitation phases and with rest phases that are respectively located between two excitation phases and in which substantially no coil current flows,
wherein in one of the rest phases, the excitation signal is generated and the corresponding response signal is received.

10. The magnetically inductive flow measuring device of claim 1,
wherein an operating circuit is configured to determine a measured value of an electrical capacitance of the field guide assembly to the medium at least on the basis of a response signal and to determine information regarding the fill level on the basis of a deviation of the determined measured value from a reference capacitance.

11. A method for determining the fill level in the tube line using the magnetically inductive flow measuring device of claim 1, the method comprising:
supplying an electrical, temporally alternating, excitation signal to the field guiding body,
receiving an electrical reception signal from the field guide body,
determining a measuring capacitance of the field guide body at least on the basis of the reception signal, and
determining the fill level in the tube line or the measuring tube on the basis of the measuring capacitance.

* * * * *